United States Patent
Matsumura et al.

(10) Patent No.: US 7,506,427 B2
(45) Date of Patent: Mar. 24, 2009

(54) METHOD OF ASSEMBLING A CARRIAGE ASSEMBLY

(75) Inventors: Takayoshi Matsumura, Kawasaki (JP); Naoki Ishikawa, Kawasaki (JP); Hiroshi Kobayashi, Kawasaki (JP); Hidehiko Kira, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 397 days.

(21) Appl. No.: 11/363,199

(22) Filed: Feb. 28, 2006

(65) Prior Publication Data
US 2007/0126104 A1 Jun. 7, 2007

(30) Foreign Application Priority Data
Nov. 30, 2005 (JP) ............................. 2005-346340

(51) Int. Cl.
*G11B 5/127* (2006.01)
*H04R 31/00* (2006.01)
(52) U.S. Cl. .............. 29/603.06; 29/603.03; 29/603.04; 29/603.07; 360/265.6; 360/266.1; 360/264.1
(58) Field of Classification Search .............. 29/603.03, 29/603.04, 603.06, 603.07; 360/265.6, 266.1, 360/264.1, 345.2
See application file for complete search history.

(56) References Cited

U.S. PATENT DOCUMENTS 6,035,681 A * 3/2000 Chung et al. .................. 72/42

FOREIGN PATENT DOCUMENTS

| JP | 2004-127491 | 4/2004 |
| JP | 2005-64149 | 3/2005 |

* cited by examiner

*Primary Examiner*—Paul D Kim
(74) *Attorney, Agent, or Firm*—Staas & Halsey LLP

(57) ABSTRACT

A method of assembling a carriage assembly is disclosed. The method is are capable of suppressing fluctuation in the crimped (deformed) states of spacer portions when suspensions are attached to carriage arms. The method aligns fitting holes 10a provided in carriage arms 10 with spacer holes 12b of suspensions 12. Then the method passes a ball 20 with a diameter equal to or greater than an inner diameter of the spacer holes 12b through the spacer holes 12b to crimp edge portions of the spacer holes 12b in spacer portions 12a and thereby attach the suspensions 12 to the carriage arms 10. While the ball 20 is being pressed and sandwiched from both sides of the spacer holes 12b by two pressure-applying members 40a, 40b an ultrasonic vibration is applied to the two pressure-applying members 40a, 40b, the two pressure applying members 40a, 40b are moved so as to pass the ball 20 through the spacer holes 12b.

5 Claims, 4 Drawing Sheets

METHOD OF ASSEMBLING A CARRIAGE ASSEMBLY

BACKGROUND OF THE INVENTION

1. Field of the Invention

The present invention relates to a method of assembling a carriage assembly for use in a magnetic disk apparatus where suspensions are attached to front end portions of carriage arms, and to an assembling apparatus that uses such method.

2. Related Art

FIG. 5 is a view showing the external appearance of a carriage assembly used in a magnetic disk apparatus. In FIG. 5, reference numeral 10 designates carriage arms and 12 one example of a suspension that is connected to front ends of the carriage arms 10. A magnetic head 14 is mounted on a front end portion of each suspension 12. Each magnetic head 14 is electrically connected via a flexible circuit board 16, which is attached to side surfaces of the carriage arms 10, to a control unit 18. Reference numeral 19 designates an actuator shaft that is fixed to a base portion of the carriage arms 10. The carriage arms 10 rotate about the axis of the actuator shaft 19 to carry out seek operations on flat planes that are parallel to the surfaces of recording media.

The carriage assembly is formed by fixing each suspension 12 by crimping to both surfaces of a front end portion of one out of the carriage arms 10 that are attached so as to be parallel to the actuator shaft 19.

A conventional method of fixing the suspensions 12 to the carriage arms 10 is disclosed by Patent Document 1. FIG. 7 shows the conventional method of fixing the suspensions 12 to the carriage arms 10 disclosed in Patent Document 1.

According to this conventional method, after the suspensions 12 have been aligned with and placed upon the front ends of the respective carriage arms 10, a metal ball 20 formed with a slightly larger diameter than an inner diameter of spacer holes 12b provided in the suspensions 12 is passed through the spacer holes 12b to fix the suspensions 12 to the carriage arms 10 by crimping. Reference numeral 22 designates a pressing shaft for pressing the metal ball 20 to cause the metal ball 20 to pass through the spacer holes 12b.

FIG. 6 shows an operation that passes the metal ball 20 through the spacer holes 12b of the suspensions 12 to fix the suspensions 12 to the carriage arms 10 by crimping. The suspensions 12 are placed on both surfaces of the respective carriage arms 10 with the fitting holes 10a and the spacer holes 12b in alignment. Since the metal ball 20 is formed with a slightly larger diameter than the spacer holes 12b, when the metal ball 20 is passed through the spacer holes 12b, the metal ball 20 acts so as to press open crimping portions 13 formed on inner circumferential edges of the spacer holes 12b, and as a result, the suspensions 12 are fixed so as to "bite into" the carriage arms 10. As shown in FIG. 6, during a single crimping operation, the metal ball 20 is caused by the pressing shaft 22 to strike one carriage arm 10 after another and therefore moves successively through the spacer holes 12b.

In this way, when assembling a carriage assembly, conventionally the metal ball 20 is used to press open the spacer holes 12b to fix the suspensions 12 to the carriage arms 10 by crimping. Accordingly, depending on the balance between the external diameter of the metal ball 20 and the internal diameter of the spacer holes 12b, a problem can occur where the spacer portions 12a deform due to stress that acts thereupon during crimping, resulting in the suspensions 12 becoming displaced from the standard positions. That is, when the suspensions 12 are fixed to the carriage arms 10 by crimping, the spacer portions 12a become bent, which can result in the suspensions 12 becoming tilted with respect to the standard angle. Tilting of the suspensions 12 affects the float heights of the magnetic heads 14 above the surfaces of the recording media resulting in fluctuation in the float heights of the magnetic heads 14 above the surfaces of the recording media.

The storage capacity of modern magnetic disk apparatuses has been greatly increased, which has led to the float height of magnetic heads above the surfaces of recording media being kept low. This means that fluctuations in the float height of magnetic heads have a large effect on the information reading and writing characteristics, and therefore there are demands for the suppression of fluctuation in the float height of the magnetic heads to produce the required characteristics.

Patent Document 1 discloses a method of assembling a carriage assembly that can suppress deformation of the spacer portions 12a due to the stress applied during crimping. FIG. 8 is a diagram useful in explaining a method of assembling a carriage assembly using an ultrasonic horn 32 disclosed in Patent Document 1 as a method of assembling that can suppress deformation.

The method of assembling a carriage assembly disclosed in Patent Document 1 is characterized by using the ultrasonic horn 32 to pass the metal ball 20 through the spacer holes 12b. The metal ball 20 is the same as the metal ball 20 used in the method of assembling a carriage assembly described above. FIG. 8 shows a state of an assembly where gap maintaining plates 36 are inserted between adjacent carriage arms 10 and pressure applying plates 37a, 37b are placed in contact with both end surfaces of the carriage arms 10 so that the respective carriage arms 10 are supported by being sandwiched on both sides thereof.

The ultrasonic horn 32 applies ultrasonic vibration in the axial direction and due to the action of the ultrasonic horn 32, the metal ball 20 causes less damage to the spacer portions 12a during crimping, so that deformation is prevented when the suspensions 12 are attached to the carriage arms 10 and the suspensions 12 can be fixed to the carriage arms 10 more accurately. The reason for this is thought to be that the stress caused by the ultrasonic vibration of the ultrasonic horn 32 and the static stress due to the metal ball 20 pressing open the crimping portions 13 act so as to be superimposed, which makes it possible to reduce the resistance to deformation, and by reducing the average machining force by using a striking action that is repeated at high speed, it is possible to fix the members while suppressing deformation of the fixed portions of the suspensions 12 and the carriage arms 10.

Patent Document 1

Japanese Laid-Open Patent Publication No. 2004-127491 (see paragraphs 0003, 0004, 0015, 0023, and 0024 and FIGS. 3, 5, and 6).

However, with the above conventional method of assembling a carriage assembly that uses ultrasonic vibration, there is the problem of large fluctuations in the crimped (deformed) state of the spacer portions, that is, the spacer portions are too greatly or conversely insufficiently crimped (deformed).

When the crimping is too strong, that is, when a spacer portion is too greatly deformed, there is the problem of the spacer portion becoming bent, which causes the suspension to become tilted from the standard angle. Conversely, when the crimping is too weak, the suspension is not stably fixed to the carriage arm, resulting in problems such as rattling.

SUMMARY OF THE INVENTION

The present invention was conceived to solve the problem described above and to do so, it is an object of the present invention to provide a method of assembling a carriage assembly that compared to the conventional method can suppress fluctuation in the crimped (deformed) states of spacer portions when suspensions are attached to carriage arms and to an assembling apparatus that uses such method.

The present inventors realized that with the conventional method of assembling a carriage assembly that applies ultrasonic vibration to a ball, when the ball shallowly penetrates a spacer hole, the holding force that acts on the ball is weak, and therefore the ball becomes violent due to the ultrasonic vibration and the behavior of the ball becomes unstable. The spacer portions are therefore crimped (deformed) too strongly or too weakly, resulting in fluctuation in the crimped states of the spacer portions. By carrying out detailed investigations to solve this problem, the inventors completed the present invention.

To solve the above problem, a method of assembling a carriage assembly according to the present invention aligns fitting holes provided in front end portions of carriage arms used in a magnetic disk apparatus and spacer holes provided in spacer portions of suspensions and places the suspensions onto the carriage arms, and then passes a ball with a diameter equal to or greater than an inner diameter of the spacer holes through the spacer holes to crimp spacer hole edge portions of the spacer portions and attach the suspensions to the front end portions of the carriage arms, wherein while the ball is being pressed and sandwiched from both sides of the spacer holes by two pressure-applying members and ultrasonic vibration is applied to the pressure-applying members, the two pressure-applying members are moved so as to pass the ball through the spacer holes.

With the above method, since the ball is passed through the spacer holes in a state where the ball is held by two pressure-applying members, even when the ball shallowly penetrates a spacer hole, the ball will behave stably without moving violently. Accordingly, it is possible to suppress fluctuations in the crimped (deformed) states of the spacer portions.

In addition, the two pressure-applying members may be symmetrically displaced about a central axis of the spacer holes and contact the ball that passes through the spacer holes to cause the ball to rotate.

By doing so, since the two pressure-applying members contact and apply pressure to the ball at positions symmetrically displaced with respect to the central axis of the spacer holes, a couple produced by the pressing forces of the pressure-applying members acts on the ball, causing the ball to rotate. The present inventors discovered that by doing so, it is possible to avoid having an excessive force applied to the spacer portions when the ball passes through the spacer holes and therefore deformation of the spacer portions is reduced.

Also, by applying ultrasonic vibration with frequencies that are integer multiples of a predetermined frequency to the pressure-applying members from two axial directions, the pressure-applying members may be vibrated with a two-dimensional movement path on a predetermined plane to cause the ball that passes through the spacer holes to rotate.

In this way, by applying ultrasonic vibration with frequencies that are integer multiples of a predetermined frequency to the pressure-applying members from two axial directions, the pressure-applying members can be vibrated with a curved movement path on a predetermined plane. Since the pressure-applying members are repeatedly moved on the same movement path with a predetermined cycle, the directions of movement of the pressure-applying members when the pressure-applying members contact the ball become fixed. Accordingly, the ball can be passed through the spacer holes while being caused to rotate in a predetermined direction. The present inventors discovered that by doing so, it is possible to further avoid having an excessive force applied to the spacer portions when the ball passes through the spacer holes and therefore deformation of the spacer portions is reduced.

In addition, the movement path of the pressure-applying members due to the ultrasonic vibration may be one of a circle or an oval.

By doing so, it is possible to use a simple construction where the frequencies of the ultrasonic vibration applied from the two axial directions are equal.

Also, by applying ultrasonic vibration to the pressure-applying members from two axial directions that are a pressing direction for the ball and a direction perpendicular to the pressing direction, the pressure-applying members may be vibrated with a movement path on a plane parallel to the pressing direction, causing the ball to rotate about a rotational axis that is substantially perpendicular to the pressing direction.

By doing so, it is possible to cause the ball to rotate about a rotational axis that is substantially perpendicular to the pressing direction. The present inventors discovered that by doing so, it is possible to further avoid having an excessive force applied to the spacer portions when the ball passes through the spacer holes and therefore deformation of the spacer portions is reduced.

To solve the above problem, an assembling apparatus for a carriage assembly according to the present invention is used by a method of assembling a carriage assembly that aligns fitting holes provided in front end portions of carriage arms used in a magnetic disk apparatus and spacer holes provided in spacer portions of suspensions and places the suspensions onto the carriage arms, and then passes a ball with a diameter equal to or greater than an inner diameter of the spacer holes through the spacer holes to crimp spacer hole edge portions of the spacer portions and attach the suspensions to the front end portions of the carriage arms, the assembling apparatus including: two pressure-applying members that are capable of pressing and sandwiching the ball from both sides of the spacer holes and are provided so as to be capable of moving so as to pass the sandwiched ball through the spacer holes, and an ultrasonic vibrating unit that is capable of applying ultrasonic vibration to the two pressure-applying members.

With the above construction, since the ball is passed through the spacer holes in a state where the ball is held by two pressure-applying members, even when the ball shallowly penetrates a spacer hole, the ball will behave stably without moving violently. Accordingly, it is possible to suppress fluctuations in the crimped (deformed) states of the spacer portions.

Also, the two pressure-applying members may be provided so as to be symmetrically displaced about a central axis of the spacer holes and contact the ball that passes through the spacer holes to cause the ball to rotate.

By doing so, since the two pressure-applying members contact and apply pressure to the ball at positions symmetrically displaced with respect to the central axis of the spacer holes, a couple produced by the pressing forces of the pressure-applying members acts on the ball, causing the ball to rotate. The present inventors discovered that by doing so, it is possible to avoid having an excessive force applied to the spacer portions when the ball passes through the spacer holes and therefore deformation of the spacer portions is reduced.

Also, the ultrasonic vibrating unit may apply ultrasonic vibration with frequencies that are integer multiples of a predetermined frequency to the pressure-applying members from two axial directions to cause the pressure-applying members to vibrate with a two-dimensional movement path on a predetermined plane to cause the ball that passes through the spacer holes to rotate.

In this way, by applying ultrasonic vibration with frequencies that are integer multiples of a predetermined frequency to the pressure-applying members from two axial directions, the pressure-applying members can be vibrated with a curved movement path on a predetermined plane. Since the pressure-applying members are repeatedly moved on the same movement path with a predetermined cycle, the directions of movement of the pressure-applying members when the pressure-applying members contact the ball become fixed. Accordingly, the ball can be passed through the spacer holes while being caused to rotate in a predetermined direction. The present inventors discovered that by doing so, it is possible to further avoid having an excessive force applied to the spacer portions when the ball passes through the spacer holes and therefore deformation of the spacer portions is reduced.

In addition, the movement path of the pressure-applying members due to the ultrasonic vibration produced by the ultrasonic vibrating unit may be one of a circle or an oval.

By doing so, it is possible to use a simple construction where the frequencies of the ultrasonic vibration applied from the two axial directions are equal.

Also, the ultrasonic vibrating unit may apply ultrasonic vibration to the pressure-applying members from two axial directions that are a pressing direction for the ball and a direction perpendicular to the pressing direction to vibrate the pressure-applying members with a movement path on a plane parallel to the pressing direction, thereby causing the ball to rotate about a rotational axis that is substantially perpendicular to the direction in which the pressure-applying members press the ball.

By doing so, it is possible to cause the ball to rotate about a rotational axis that is substantially perpendicular to the pressing direction. The present inventors discovered that by doing so, it is possible to further avoid having an excessive force applied to the spacer portions when the ball passes through the spacer holes and therefore deformation of the spacer portions is reduced.

According to the method of assembling a carriage assembly and assembling apparatus according to the present invention, fluctuations in the crimped (deformed) state of the spacer portions when attaching the suspensions to the carriage arms can be suppressed. Accordingly, it is possible to suppress occurrences of the problem where the spacer portions are too greatly deformed and become bent, resulting in the suspensions becoming tilted from the standard angle, and of the problem where the crimping is too weak and the suspensions are not stably fixed to the carriage arms, resulting in rattling and the like.

BRIEF DESCRIPTION OF THE DRAWINGS

The aforementioned and other objects and advantages of the present invention will become apparent to those skilled in the art upon reading and understanding the following detailed description with reference to the accompanying drawings.

In the drawings.

DESCRIPTION OF THE PREFERRED EMBODIMENTS

Figure 5:
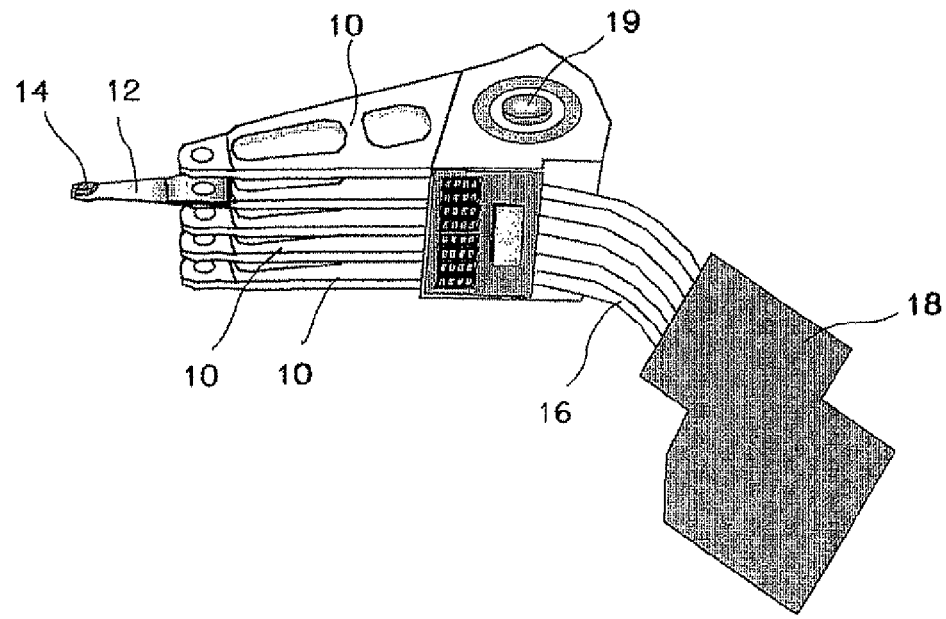
FIG. 5 is a view showing the appearance of a carriage assembly.

The carriage assembly to be assembled by the method of assembling a carriage assembly and assembling apparatus according to the following embodiments of the present invention is shown in FIG. 5. The overall construction of the carriage assembly shown in FIG. 5 has been described for the conventional art, and therefore description thereof is omitted here.

First Embodiment

Figure 1:
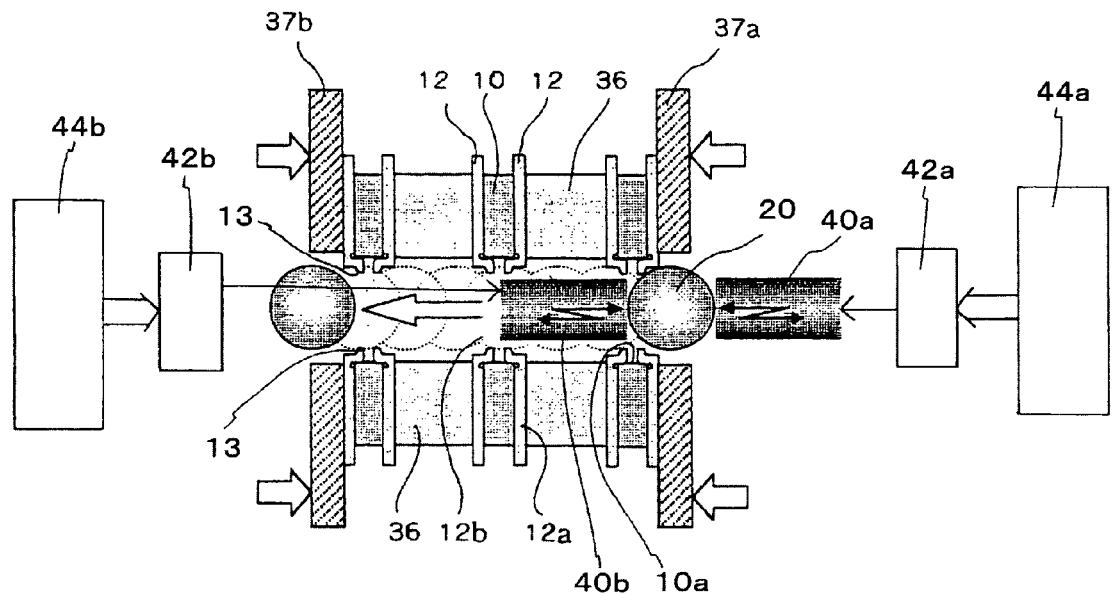
FIG. 1 is a diagram useful in explaining a method of assembling a carriage assembly and an assembling apparatus according to a first embodiment of the present invention.

FIG. 1 is a diagram useful in explaining the method of assembling a carriage assembly and assembling apparatus according to a first embodiment. In FIG. 1, the carriage arms 10 and the suspensions 12 have the same forms as in the conventional art described earlier. That is, the fitting holes 10a are provided in the front ends of the carriage arms 10 and the spacer holes 12b to be fitted into the fitting holes 10a are provided in the spacer portions 12a provided at the base portions of the suspensions 12.

The assembling apparatus for a carriage assembly that uses the method of assembling a carriage assembly according to the first embodiment includes two (a pair of) ultrasonic horns 40a, 40b, ultrasonic vibrating devices 42a, 42b as ultrasonic vibrating means that apply ultrasonic vibration to the ultrasonic horns 40a, 40b respectively, and driving devices 44a, 44b capable of moving and controlling the ultrasonic horns 40a, 40b respectively.

The two ultrasonic horns 40a, 40b are cylindrical in form and are provided so as to be capable of being coaxially inserted through the spacer holes 12b from both sides of the spacer holes 12b. The ultrasonic horns 40a, 40b can respectively transmit ultrasonic vibration produced by the ultrasonic vibrating devices 42a, 42b and are moved by the driving devices 44a, 44b to function as pressing members that pass through the spacer holes 12b in a state where the ultrasonic horns 40a, 40b sandwich and apply pressure to the metal ball 20 from both sides of the spacer holes 12b.

It should be noted that the metal ball 20 is formed with a slightly larger diameter than the inner diameter of the spacer holes 12b.

The ultrasonic vibrating devices 42a, 42b apply ultrasonic vibration to the ultrasonic horns 40a, 40b to cause the ultrasonic horns 40a, 40b to ultrasonically vibrate in the pressing direction of the metal ball 20 (that is, the axial direction of the spacer holes 12b).

The driving devices 44a, 44b are provided so as to be capable of moving and controlling the respective ultrasonic horns 40a, 40b.

The driving devices 44a, 44b are controlled by the same control unit and are provided so as to act in concert to drive the ultrasonic horns 40a, 40b. More specifically, the driving devices 44a, 44b can move the ultrasonic horns 40a, 40b so as to insert the ultrasonic horns 40a, 40b from both sides of the spacer holes 12b and move and control the ultrasonic horns 40a, 40b so that the metal ball 20 is pressed and sandwiched from both sides of the spacer holes 12b. In addition, the ultrasonic horns 40a, 40b can be moved and controlled so as to pass the metal ball 20 through the spacer holes 12b in a state where the metal ball 20 is sandwiched between the ultrasonic horns 40a, 40b.

Next, the method of assembling a carriage assembly using the assembling apparatus for a carriage assembly according to the first embodiment will be described.

FIG. 1 shows an operation where the assembling apparatus for a carriage assembly is used to pass the metal ball 20 through the spacer holes 12b of the suspensions 12 to crimp and fix the suspensions 12 to the carriage arms 10.

As shown in FIG. 1, in the method of assembling a carriage assembly according to the first embodiment, the suspensions 12 are placed on both surfaces of the respective carriage arms 10 so that the spacer holes 12b and the fitting holes 10a are aligned. In addition, the gap maintaining plates 36 are inserted between adjacent carriage arms 10 and the pressure-applying plates 37a, 37b are placed in contact with both end surfaces of the carriage arms 10 so that the carriage arms 10 are sandwiched from both sides.

In this state, the assembling apparatus of the carriage assembly is used to pass the metal ball 20 through the spacer holes 12b.

In more detail, first the metal ball 20 is aligned with the spacer holes 12b and is disposed on one side of the spacer holes 12b. Next, the ultrasonic horns 40a, 40b are moved by the driving devices 44a, 44b so as to be inserted into the spacer holes 12b from both sides and so that the ultrasonic horns 40a, 40b press and sandwich the metal ball 20 disposed on one side of the spacer holes 12b from both sides of the spacer holes 12b. In addition, in the state where the metal ball 20 is sandwiched between the ultrasonic horns 40a, 40b, the ultrasonic horns 40a, 40b are moved and controlled by the driving devices 44a, 44b so that the metal ball 20 is passed through the spacer holes 12b. When doing so, the ultrasonic vibrating devices 42a, 42b are driven to apply ultrasonic vibration to the ultrasonic horns 40a, 40b and cause the metal ball 20 to pass through the spacer holes 12b.

Figure 6:
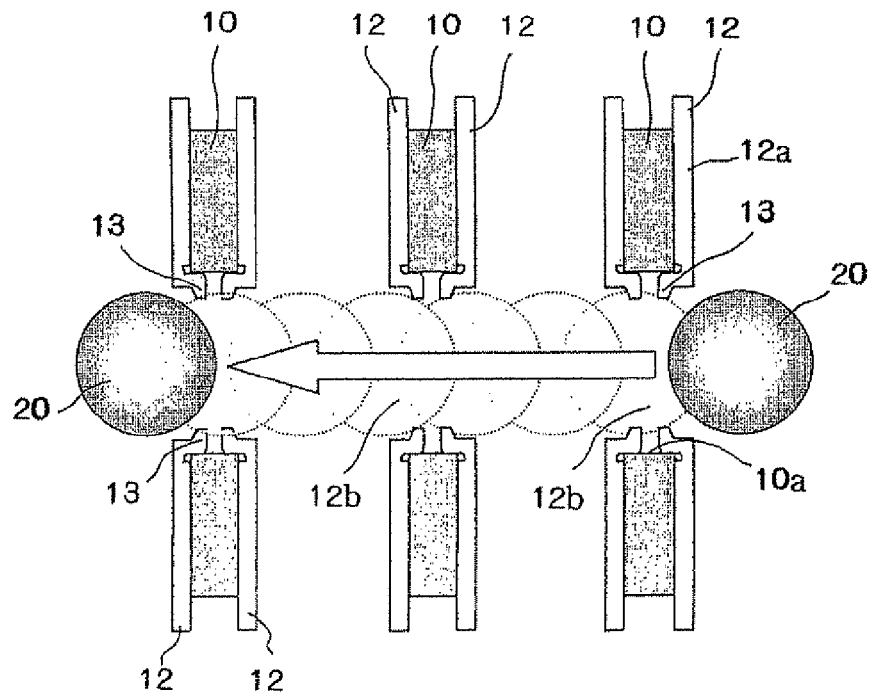
FIG. 6 is a diagram useful in explaining the action that crimps and fixes suspensions to carriage arms by passing a metal ball (ball) through spacer holes of the suspensions.
Figure 7:
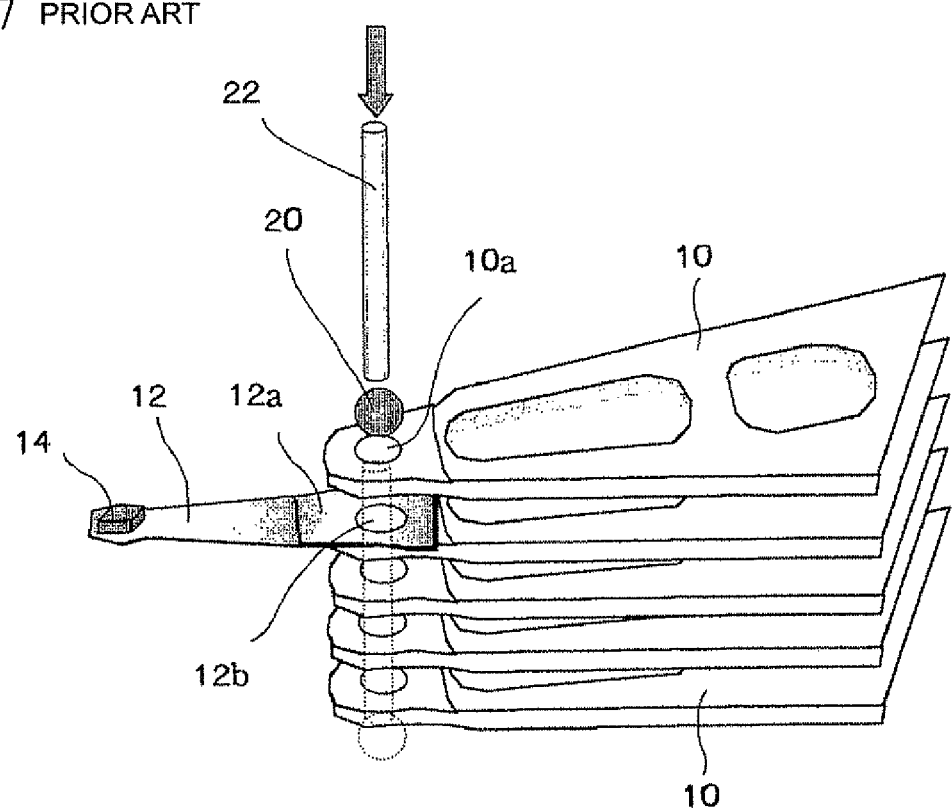
FIG. 7 is a diagram useful in explaining a conventional method of assembling a carriage assembly.
Figure 8:
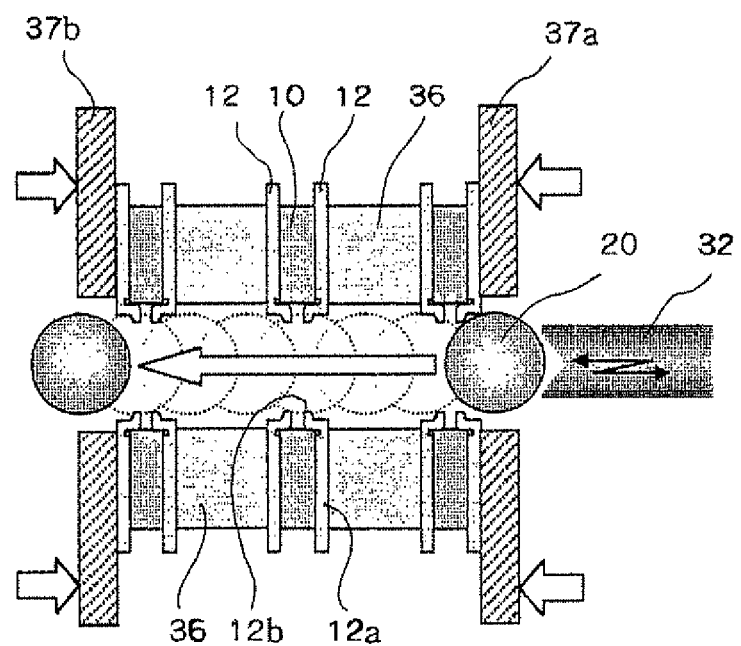
FIG. 8 is a diagram useful in explaining a conventional method of assembling a carriage assembly.

Since the metal ball 20 is formed with a slightly larger diameter than the spacer holes 12b, when the metal ball 20 passes through the spacer holes 12b, the metal ball 20 act so as to press open the crimping portions 13 formed at the inner circumferential edges of the spacer holes 12b and as a result, the suspensions 12 are fixed so as to bite into the carriage arms 10. As shown in FIGS. 1 and 6, the metal ball 20 moves in a state where the metal ball 20 is held between the ultrasonic horns 40a, 40b so as to pass through the successive spacer holes 12b from one side of the carriage arms 10 to the other in a single crimping operation.

In the conventional method of assembling a carriage assembly, when the metal ball shallowly penetrates a spacer hole, the holding force that acts on the ball is weak, and therefore the ball becomes violent due to the ultrasonic vibration and the behavior of the ball becomes unstable. The spacer portions are therefore crimped (deformed) too strongly or too weakly, resulting in fluctuation in the crimped states of the spacer portions.

On the other hand, according to the method of assembling a carriage assembly according to the first embodiment, since the metal ball 20 is pressed and sandwiched from both sides of the spacer holes 12b by two pressure-applying members (the ultrasonic horns 40a, 40b), even when the metal ball 20 shallowly penetrates a spacer hole 12b, the metal ball 20 will behave stably without moving violently and therefore it is possible to suppress fluctuations in the crimped (deformed) states of the spacer portions 12a.

Second Embodiment

Figure 2:
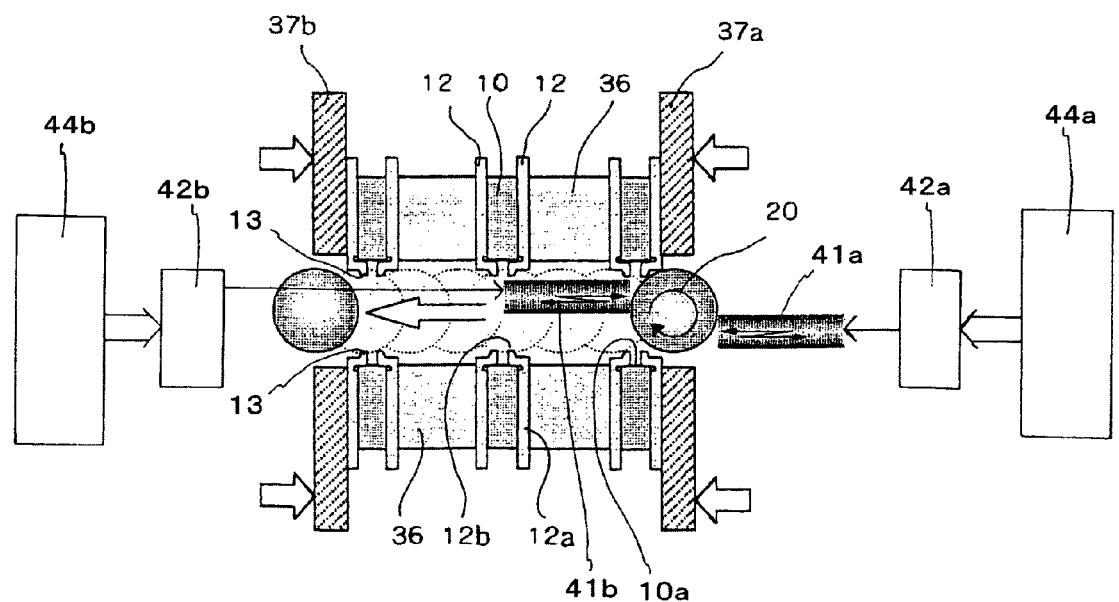
FIG. 2 is a diagram useful in explaining a method of assembling a carriage assembly and an assembling apparatus according to a second embodiment of the present invention.

FIG. 2 is a diagram useful in explaining a method of assembling a carriage assembly and an assembling apparatus according to a second embodiment of the present invention.

Note that parts of the second embodiment with the same construction as in the first embodiment have been assigned the same reference numerals and description thereof has been omitted.

The second embodiment differs to the first embodiment as shown in FIG. 2 in that a pair of ultrasonic horns 41a, 41b as pressure-applying members are formed with a smaller diameter than the ultrasonic horns 40a, 40b of the first embodiment and in that the ultrasonic horns 41a, 41b are disposed so that the respective axes of the ultrasonic horns 41a, 41b are symmetrically displaced with respect to a central axis of the spacer holes 12b.

According to the assembling apparatus for a carriage assembly according to the second embodiment and the method of assembling used therein, in addition to the effects of the first embodiment, since the ultrasonic horns 41a, 41b contact and apply pressure to the metal ball 20 at positions symmetrically displaced with respect to the central axis of the spacer holes 12b, a couple produced by the pressing forces of the ultrasonic horns 41a, 41b acts on the metal ball 20, causing the metal ball 20 to rotate (see the arrow in FIG. 2).

The present inventors discovered that by rotating the metal ball 20, it is possible to avoid having an excessive force applied to the spacer portions 12a when the metal ball 20 passes through the spacer holes 12b and therefore deformation of the spacer portions 12a is reduced. By reducing the deformation of the spacer portions 12a, it is possible to reduce the fluctuation in the float height of the magnetic head. Note that the present inventors suppose that the reason for this is that while static friction is produced between the metal ball 20 and the crimping portions 13 with the conventional method, according to the second embodiment, a dynamic friction that is smaller than the static friction acts between the metal ball 20 and the crimping portions 13 due to the metal ball 20 rotating.

Third Embodiment

Figure 3:
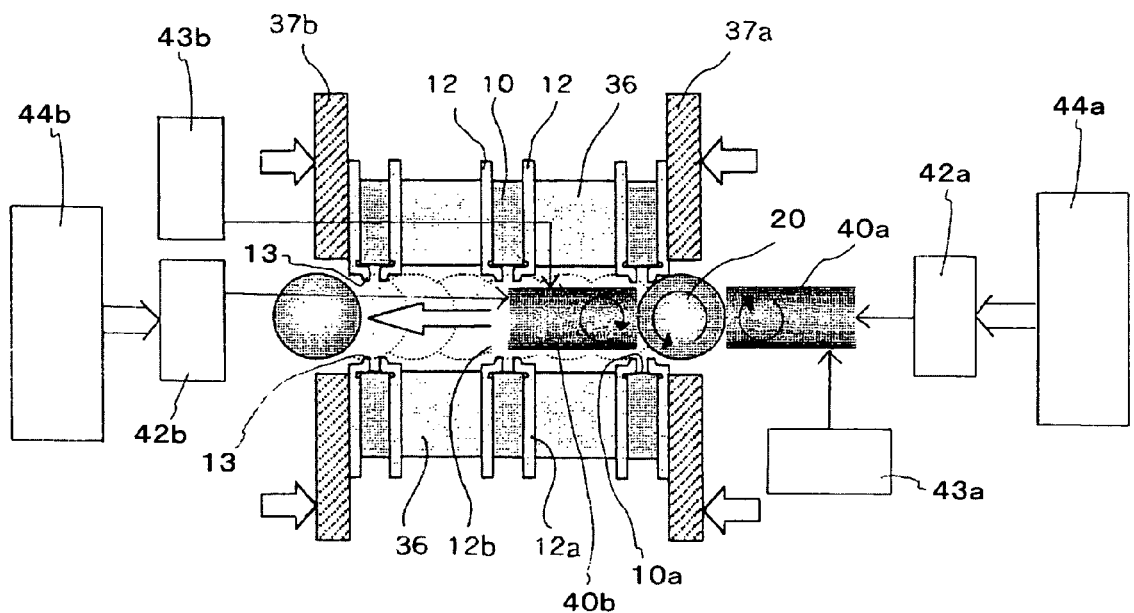
FIG. 3 is a diagram useful in explaining a method of assembling a carriage assembly and an assembling apparatus according to a third embodiment of the present invention.

FIG. 3 is a diagram useful in explaining a method of assembling a carriage assembly and an assembling apparatus according to a third embodiment of the present invention.

Note that parts of the third embodiment with the same construction as in the first embodiment have been assigned the same reference numerals and description thereof has been omitted.

The third embodiment differs to the first embodiment as shown in FIG. 3 in that two ultrasonic vibrating devices are provided for each of the ultrasonic horns 40a, 40b as the ultrasonic vibration means.

In the same way as in the first embodiment, the ultrasonic vibrating device 42a ultrasonically vibrates the ultrasonic horn 40a in the pressing direction of the metal ball 20 (that is, in the axial direction of the spacer holes 12b). On the other hand, the other ultrasonic vibrating device 43a corresponding to the ultrasonic horn 40a ultrasonically vibrates the ultrasonic horn 40a in a direction perpendicular to the pressing direction. More specifically, the ultrasonic vibrator of the ultrasonic vibrating device 42a that ultrasonically vibrates contacts the ultrasonic horn 40a from the axial direction thereof and the ultrasonic vibrator of the other ultrasonic vibrating device 43a contacts a side surface of the ultrasonic horn 40a from a direction perpendicular to the axial direction, with both ultrasonic vibrators transmitting ultrasonic vibration to the ultrasonic horn 40a.

That is, ultrasonic vibration is applied by the two ultrasonic vibrating devices 42a and 43a to the ultrasonic horn 40a in two axial directions that are the pressing direction and the direction perpendicular to the pressing direction. By doing so, the ultrasonic horn 40a vibrates on a movement path on a plane that is parallel to the pressing direction.

It should be noted that the same construction is provided for the other ultrasonic horn 40b so that the ultrasonic vibrating devices 42b, 43b apply ultrasonic vibration in two axial directions composed of the pressing direction and a direction perpendicular to the pressing direction.

Figure 4:
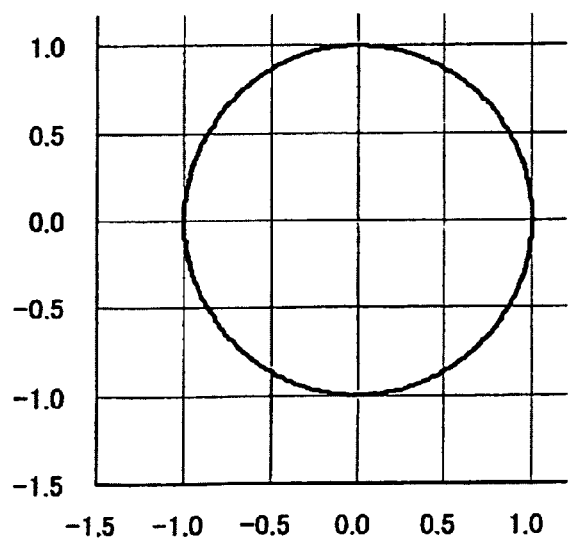
FIG. 4 is a graph showing one example of a movement path of ultrasonic horns (pressure-applying members) according to a method of assembling a carriage assembly and an assembling apparatus according to the third embodiment of the present invention.

FIG. 4 shows an example of the movement path of the ultrasonic horns 40a, 40b. In FIG. 4, the horizontal axis (X axis) shows the displacement of the ultrasonic horns 40a, 40b in the pressing direction and the vertical axis (Y axis) shows the displacement of the ultrasonic horns 40a, 40b in the direction perpendicular to the pressing direction (i.e., the up-down direction in FIG. 3). That is, the amplitude of the ultrasonic horns 40a, 40b due to the ultrasonic vibrating devices 42a, 42b is expressed by the horizontal axis (X axis) in FIG. 4 and the amplitude due to the ultrasonic vibrating devices 43a, 43b is expressed by the vertical axis (Y axis).

In the example shown in FIG. 4, when the ranges of the displacements of the ultrasonic vibration due to the ultrasonic vibrating devices 42a, 42b and the ultrasonic vibrating devices 43a, 43b are expressed as −1 to 1 (i.e., the respective amplitudes are 2), the displacements in the X axis and the Y axis of the ultrasonic horns 40a, 40b are expressed by the equations $X=\sin(2\pi ft)$, $Y=\cos(2\pi ft)$ (where f is the frequency (in Hz) of the ultrasonic vibration and t is elapsed time (in seconds)).

By doing so, as shown by the arrow in FIG. 1 and by FIG. 4, the ultrasonic horns 40a, 40b are vibrated on a circular movement path on a plane that is parallel to the pressing direction.

According to the assembling apparatus for a carriage assembly according to the third embodiment and the method of assembling used therein, in addition to the effects of the first embodiment, as described above, during crimping the ultrasonic horns 40a, 40b are vibrated on circular movement paths on a plane that is parallel to the pressing direction. By doing so, the ultrasonic horns 40a, 40b are moved toward and away from the metal ball 20, and since the ultrasonic horns 40a, 40b move in predetermined directions at the instant when the ultrasonic horns 40a, 40b contact the metal ball 20 (upward for the ultrasonic horn 40a in FIG. 3 and downward for the ultrasonic horn 40b in FIG. 3, the metal ball 20 is caused to rotate in a predetermined direction about a rotational axis that is substantially perpendicular to the pressing direction (in FIG. 3, the metal ball 20 is caused to rotate counterclockwise as shown by the arrow).

The present inventors discovered that in the same way as with the second embodiment described above, by rotating the metal ball 20, excessive force is not applied to the spacer portions 12a when the metal ball 20 is passed through the spacer holes 12b and therefore deformation of the spacer portions 12a is reduced. By reducing the deformation of the spacer portions 12a, it is possible to reduce the fluctuation in the float height of the magnetic head.

It should be noted that in the third embodiment, as should be clear from the f value being the same in the equations expressing the displacements of the ultrasonic horns 40a, 40b in the two axial directions, the frequencies of the ultrasonic vibration applied in the two axial direction are equal. However, the present invention is not limited to this and may be constructed so that ultrasonic vibration of frequencies that are different integer multiples of a predetermined frequency are applied in the two axial directions. For example, the frequency F of the ultrasonic vibration applied in the Y axis direction may be set at double the frequency f of the ultrasonic vibration applied in the X axis direction (i.e., F=2f) and the displacement due to the respective ultrasonic vibrations may be set so as to be expressed by the equations $X=\sin(2\pi ft)$ and $Y=\cos(2\pi Ft)$. By doing so, since it is possible to set the direction of movement of the ultrasonic horns 40a, 40b at a predetermined direction when the ultrasonic horns 40a, 40b contact the metal ball 20, it is possible to cause the metal ball 20 to rotate in a "predetermined direction"(that is, a predetermined direction of rotation).

It is also possible to set the amplitude of the ultrasonic vibration in the X axis direction and the amplitude of the ultrasonic vibration in the Y axis direction differently, that is, to set the respective equations at $X=A\cdot\sin(2\pi ft)$ and $Y=B\cdot\cos(2\pi ft)$ (where the values A and B are constants such that $A\neq B$) for example, so that the movement paths of the ultrasonic horns 40a, 40b become oval.

Also, although the third embodiment is constructed so that ultrasonic vibration is applied to the ultrasonic horns 40a, 40b from two axial directions that are the pressing direction for the metal ball 20 and a direction perpendicular to the pressing direction, the two axial directions for the present invention are not limited to such. For example, if the two axial directions are set as directions that are both perpendicular to the pressing direction and are perpendicular to each other, it is possible to cause the ultrasonic horns 40a, 40b to move on a movement path on a plane perpendicular to the pressing direction and to cause the metal ball 20 to rotate about a rotational axis that is parallel to the pressing direction.

What is claimed is:

1. A method of assembling a carriage assembly comprising:
   aligning fitting holes provided in front end portions of carriage arms and spacer holes provided in spacer portions of suspensions so as to support the carriage arms and the suspensions; and
   passing a ball with a diameter equal to or greater than an inner diameter of the spacer holes through the spacer holes to crimp spacer hole edge portions of the spacer portions and attach the suspensions to the carriage arms,
   wherein said passing comprises:
      pressing and sandwiched the ball from both sides of the spacer holes by two pressure-applying members; and
      moving the two pressure-applying members, with applying ultrasonic vibration to the two pressure-applying members, so as to pass the ball through the spacer holes.

2. A method of assembling a carriage assembly according to claim 1, wherein the two pressure-applying members are symmetrically displaced about a central axis of the spacer holes and contact the ball that passes through the spacer holes to cause the ball to rotate.

3. A method of assembling a carriage assembly according to claim 1, wherein by applying ultrasonic vibration with frequencies that are integer multiples of a predetermined frequency to the pressure-applying members from two axial directions, the pressure-applying members are vibrated with a two-dimensional movement path on a predetermined plane to cause the ball that passes through the spacer holes to rotate.

4. A method of assembling a carriage assembly according to claim 3, wherein the movement path of the pressure-applying members due to the ultrasonic vibration is one of a circle or an oval.

5. A method of assembling a carriage assembly according to claim 3, wherein by applying ultrasonic vibration to the pressure-applying members from two axial directions that are a pressing direction for the ball and a direction perpendicular to the pressing direction, the pressure-applying members are vibrated with a movement path on a plane parallel to the pressing direction, causing the ball to rotate about a rotational axis that is substantially perpendicular to the pressing direction.

* * * * *

UNITED STATES PATENT AND TRADEMARK OFFICE
CERTIFICATE OF CORRECTION

PATENT NO.        : 7,506,427 B2                                Page 1 of 1
APPLICATION NO. : 11/363199
DATED             : March 24, 2009
INVENTOR(S)       : Takayoshi Matsumura et al.

It is certified that error appears in the above-identified patent and that said Letters Patent is hereby corrected as shown below:

Title Page, Column 2 (Abstract), Line 2, before "capable" delete "are".

Column 10, Line 61, change "sandwiched" to --sandwiching--.

Column 11, Line 1, change "A" to --The--.

Column 11, Line 6, change "A" to --The--.

Column 11, Line 13, change "A" to --The--.

Column 12, Line 3, change "A" to --The--.

Signed and Sealed this

Fourteenth Day of July, 2009

JOHN DOLL
*Acting Director of the United States Patent and Trademark Office*